(12) United States Patent
Tan et al.

(10) Patent No.: US 10,329,172 B2
(45) Date of Patent: Jun. 25, 2019

(54) ELECTRODE, PREPARATION METHOD THEREFOR, AND USES THEREOF

(71) Applicants: Yan Tan, Beijing (CN); Ruizhi Feng, Beijing (CN)

(72) Inventors: Yan Tan, Beijing (CN); Ruizhi Feng, Beijing (CN)

(73) Assignee: Yan Tang & Ruizhi Feng, Beijing (CN)

( * ) Notice: Subject to any disclaimer, the term of this patent is extended or adjusted under 35 U.S.C. 154(b) by 119 days.

(21) Appl. No.: 15/509,380

(22) PCT Filed: Sep. 10, 2014

(86) PCT No.: PCT/CN2014/086222
§ 371 (c)(1),
(2) Date: Apr. 17, 2017

(87) PCT Pub. No.: WO2016/037329
PCT Pub. Date: Mar. 17, 2016

(65) Prior Publication Data
US 2017/0247269 A1     Aug. 31, 2017

(51) Int. Cl.
*C02F 1/461* (2006.01)
*C02F 1/46* (2006.01)
(Continued)

(52) U.S. Cl.
CPC .......... *C02F 1/46109* (2013.01); *A23L 3/001* (2013.01); *A23L 3/3589* (2013.01);
(Continued)

(58) Field of Classification Search
CPC .. C02F 2001/46133; C02F 2001/46138; C02F 2001/46142; C02F 1/46;
(Continued)

(56) References Cited

U.S. PATENT DOCUMENTS

| | | | |
|---|---|---|---|
| 2005/0183949 A1* | 8/2005 | Daly | C02F 1/46104 204/242 |
| 2007/0134428 A1* | 6/2007 | Carlson | C25B 1/265 427/419.2 |
| 2007/0261968 A1* | 11/2007 | Carlson | C25B 1/26 205/354 |

OTHER PUBLICATIONS

English Abstract of CN-102370106-A, Mar. 2012. (Year: 2012).*

* cited by examiner

*Primary Examiner* — David G Cormier
(74) *Attorney, Agent, or Firm* — Lewis Roca Rothgerber Christie LLP

(57) ABSTRACT

An electrode, a preparation method therefor, and uses thereof. Titanium or titanium alloy is used as a base material of the electrode, the outer surface of the base material is coated with a composite material coating, and the composite material coating is prepared by coating a composite material solution and carrying out drying and sintering. The composite material solution is a nanoscale solution formed by dissolving transition metal elements in ethanol. The nanoscale solution is an ethanol solution of the nanoscale transition metal with particles of the transition metal as solutes thereof. The transition metal elements are platinum, iridium, ruthenium, gold, cerium, rhodium, tantalum, manganese, nickel, palladium, yttrium, gadolinium, cobalt, europium, lanthanum, neodymium, zirconium and titanium, and the molar ratio of the transition metal elements platinum, iridium, ruthenium, gold, cerium, rhodium, tantalum, manganese, nickel, palladium, yttrium, gadolinium, cobalt, europium, lanthanum, neodymium, zirconium and titanium in the composite material solution is 5-15:23-34:14-21:1-7:9-17:3-12:15-27: 3-6:2-9:10-23:15-27:2-8:15-30:3-12:4-14:1-10:6-15:20-50.

21 Claims, 3 Drawing Sheets

(51) Int. Cl.
 A23L 3/00 (2006.01)
 A23L 3/3589 (2006.01)
 B08B 3/10 (2006.01)
 B08B 3/14 (2006.01)
 B22F 3/10 (2006.01)
 C22C 12/00 (2006.01)
 C22C 13/02 (2006.01)
 C22C 14/00 (2006.01)
 H01B 13/00 (2006.01)
 C25B 11/04 (2006.01)
 C25B 1/04 (2006.01)
 C25B 9/06 (2006.01)

(52) U.S. Cl.
 CPC ............... *B08B 3/102* (2013.01); *B08B 3/14* (2013.01); *B22F 3/1017* (2013.01); *C02F 1/46* (2013.01); *C22C 12/00* (2013.01); *C22C 13/02* (2013.01); *C22C 14/00* (2013.01); *C25B 1/04* (2013.01); *C25B 9/06* (2013.01); *C25B 11/0431* (2013.01); *C25B 11/0478* (2013.01); *C25B 11/0494* (2013.01); *H01B 13/0036* (2013.01); *A23V 2002/00* (2013.01); *B22F 2301/205* (2013.01); *B22F 2301/30* (2013.01); *C02F 2001/46142* (2013.01)

(58) Field of Classification Search
 CPC ...... C02F 1/46109; A23L 3/001; A23L 3/358; B08B 3/102; B08B 3/14; C22C 12/00; C22C 14/00; C22C 5/00; C22C 5/02; C22C 5/04; C22C 19/07; B22F 2301/205
 See application file for complete search history.

ELECTRODE, PREPARATION METHOD THEREFOR, AND USES THEREOF

CROSS-REFERENCE TO RELATED APPLICATION(S)

This application is a National Phase Patent Application and claims the priority of International Application Number PCT/CN2014/086222, filed Sep. 10, 2014, the entire content of which is incorporated herein by reference.

FIELD OF THE INVENTION

The present invention relates to an electrode, preparation method therefor and uses thereof, particularly to an electrode which may produce a hydroxyl group from water, preparation method therefor and uses thereof.

BACKGROUND OF THE INVENTION

Food security is relative to the life safety and health of the mass and relates to the healthy development of the economy and social stability, food security has become an important aspect of measuring people's quality of life, social management level and national legal construction. At present, China's food safety situation is not optimistic, for a long time, the presence of bacteria, viruses and other microbial contamination, pesticides, hormones, antibiotics and other chemical pollutants have brought huge potential security problems to food, food-borne diseases are still the biggest human health killer. At the same time, there are security risks in the disinfection of tableware which closely is related to the diet. At present, because of lack of self-discipline and the simple disinfection process in partial disinfection companies which does not meet the requirements, the disinfect tableware happens occasionally, and the surface of the tableware becomes a breeding ground for bacteria, which seriously threaten the health and life of the consumers.

Because the food pollution relates to many links, it is hard to control the source, the food pollution cannot be solved completely in a short time just by depending on the strong government regulation and the detection of functional departments. Therefore, food disinfection and purification is a necessary measure to ease food safety pressure, reduce the risk of food poisoning and protect the people's food safety.

Chinese invention patent no. ZL201110271764.0 discloses a water catalyst sterilization and detoxification device, the device is capable of purifying fresh food, water, cutlery and clothing, the device comprises a water catalyst generator (1) and a direct current power which power the water catalyst generator (1), the water catalyst generator (1) comprises two cooperating electrodes, and the two electrodes are anode electrodes and cathode electrodes respectively connected to the positive and negative output terminals of the direct current power supply; the anode electrode and the cathode electrode are titanium electrodes, and the outer surface of said anode electrode is coated uniformly with a layer of a composite material coating; the composite material coating is obtained by drying and sintering the composite material coating solution which coated on the outer surface of the anode electrode, the composite material coating solution is a mixture of six kinds of powder and anhydrous ethanol with a mass concentration of 2.5%~4%, wherein the six kinds of the powders are a platinum powder or a platinum-containing compound powder, a iridium powder or a iridium-containing compound powder, a yttrium powder or a yttrium-containing compound powder, a ruthenium powder or a ruthenium-containing compound powder, a niobium powder or a niobium-containing compound powder and a tantalum powder or a tantalum-containing compound powder respectively.

However, the electrode coating used in the above-mentioned water catalyst sterilization and detoxification device easily falls off and is unstable. The elements used in the above-mentioned electrodes do not similar electron shell arrangement with that of the substrate, the binding force of the coated electrode and the substrate is not strong and easily falls off after sintering, and the elements used in the present invention make up for the deficiency, the coating is well bonded to the substrate during sintering.

SUMMARY OF THE INVENTION

Based on many beneficial effects obtained through the present inventors' research, one object of the present invention is to provide an electrode, the coating of the electrode does not easily fall off, and has strong anti-passivation effect, high electrocatalytic performance, the electrode's life is long and the electrode has good electrical conductivity. Another object of the present invention is to provide a preparation method of the above-described electrode. Still another object of the present invention is to provide a use of the above-described electrode. For example, the above-described electrode of the present invention can be used in food purification device. The food purifying device using the electrode of the present invention has a better purifying effect.

The above objectives of the present invention are achieved by adopting the following technical solutions:

In one aspect, the present invention provides an electrode, comprising a titanium or titanium alloy substrate, the outer surface of the substrate is coated with a layer of a composite material coating, the composite material coating is prepared by coating a composite material solution, then drying and sintering, wherein the composite material solution is a nanoscale solution formed by dissolving transition metal elements in ethanol, the particles of the transition metal elements are taken as the solute of the nanoscale solution, the transition metal elements are platinum, iridium, ruthenium, gold, cerium, rhodium, tantalum, manganese, nickel, palladium, yttrium, gadolinium, cobalt, europium, lanthanum, neodymium, zirconium and titanium, the molar ratio of the transition metal elements platinum, iridium, ruthenium, gold, cerium, rhodium, tantalum, manganese, nickel, palladium, yttrium, gadolinium, cobalt, europium, lanthanum, neodymium, zirconium and titanium in the composite material solution is 5~15:23~34:14~21:1~7:9~17:3~12:15~27:3~6:2~9:10~23:15~27:2~8:15~30:3~12:4~14:1~10:6~15:20~50.

Preferably, the molar ratio of the transition metal elements platinum, iridium, ruthenium, gold, cerium, rhodium, tantalum, manganese, nickel, palladium, yttrium, gadolinium, cobalt, europium, lanthanum, neodymium, zirconium and titanium in the composite material solution is 5~13:23~31:14~20:1~6:9~15:3~10:15~25:3~6:2~8:10~21:15~25:2~7:15~28:3~11:4~13:1~9:6~13:20~48;

preferably 6~13:24~31:16~20:2~6:10~15:4~10:17~25:4~6:3~8:11~21:17~25:3~7:17~28:4~11:6~13:2~9:7~13:22~48;

more preferably 6~11:24~29:16~19:2~5:10~13:4~8:17~22:4~5:3~7:11~19:17~23:3~6:17~26:4~10:6~11:2~8:7~12:22~46;

further preferably 7~11:25~29:17~19:3~5:11~13:5~8: 19~22:4~5:4~7:12~19:18~23:4~6:19~26:5~10:7~11:3~8: 8~12:24~46;

more further preferably 7~9:25~27:17~18:3~4:11~12: 5~7:19~21:4:4~6:12~17:18~21:4~5:19~23:5~8:7~9:3~6: 8~10:24~41;

most preferably 8:26:17:3:11:6:20:4:5:15:19:4:21:7:8:5: 9:29.

Preferably, the mass percentage of the composite material solution is 25%~45%, preferably 30%~40%.

Preferably, the particle size of the particles of the transition metal elements in the composite material solution is 5~30 nm.

Preferably, the electrode further comprises a tin-antimony coating, the coating is placed between the substrate and the composite material coating, wherein the tin-antimony coating is prepared by coating a tin-antimony solution, then drying and sintering, the tin-antimony solution is a nanoscale solution formed by dissolving tin and antimony in ethanol, the particles of tin and antimony are taken as the solute of the nanoscale solution, the molar ratio of tin to antimony in the solution is 5~10:2~10;

preferably, the molar ratio of tin to antimony in the solution is 5-9:2-8;

more preferably, the molar ratio of tin to antimony in the solution is 6-9:3-8;

further preferably, the molar ratio of tin to antimony in the solution is 6-8:3-7;

more further preferably, the molar ratio of tin to antimony in the solution is 7-8:4-7;

still more further preferably, the molar ratio of tin to antimony in the solution is 7-8:4-6;

most preferably, the molar ratio of tin to antimony in the solution is 8:5.

Preferably, the particle size of the particles of tin and antimony in the solution is 5~30 nm.

Preferably, the mass/volume percentage of the tin-antimony solution is 5%~9%, preferably 7%.

Preferably, the composite material coating or the tin-antimony coating has a thickness of 3~8 microns, preferably 4~6 microns.

Preferably, the drying temperature is 100~120° C., preferably 110~120° C. when preparing the composite material coating or the tin-antimony coating.

Preferably, the sintering temperature is 400~680° C., preferably 450~600° C. when preparing the composite material coating or the tin-antimony coating.

Preferably, based on the total weight of the titanium alloy, the titanium alloy consists of Al:4.0%~4.9%; Sn:1.1%~2.5%; Cr:1.1%~2.5%; Mo:1.1%~2.5%; Zr:1.1%~2.5%; Fe:0.11%~0.15%; C:0.08%~0.16%; O:0.11%~0.26%; N:0.004%~0.2%; H:0.06%~0.28%; Si:0.02%~1.0%, the balance being titanium and unavoidable impurities;

preferably, the content of Al in the titanium alloy is 4.1%~4.6%, preferably 4.1%~4.4%;

preferably, the content of Sn in the titanium alloy is 1.2%~2.1%, preferably 1.4%~2.1%;

preferably, the content of Cr in the titanium alloy is 1.3%~2.0%, preferably 1.4%~2.1%; more preferably 1.6%~2.0%;

preferably, the content of Mo in the titanium alloy is 1.2%~2.1%, preferably 1.3%~2.0%; more preferably 1.5%~2.1%;

preferably, the content of Zr in the titanium alloy is 1.3%~2.1%, preferably 1.4%~2.1%; more preferably 1.5%~2.1%;

preferably, the content of Fe in the titanium alloy is 0.13%~0.14%, preferably 0.13% or 0.14%;

preferably, the content of C in the titanium alloy is 0.09%~0.10%, preferably 0.09%~0.12%;

preferably, the content of O in the titanium alloy is 0.13%~0.21%, preferably 0.16%~0.21%; more preferably 0.16%~0.2%;

preferably, the content of N in the titanium alloy is 0.005%~0.02%, preferably 0.006%~0.07%; more preferably 0.009%~0.04%;

preferably, the content of H in the titanium alloy is 0.07%~0.21%, preferably 0.08%~0.21%;

preferably, the content of Si in the titanium alloy is 0.04%~0.6%, preferably 0.04%~0.7%.

In another aspect, the present invention provides a method for manufacturing the above-mentioned electrode, which comprises the following steps:

(1) coating uniformly a composite material solution on the outer surface of a titanium or titanium alloy substrate, wherein the composite material solution is a nanoscale solution formed by dissolving transition metal elements in ethanol, the particles of the transition metal elements are taken as the solute of the nanoscale solution, the mass percentage of the nanoscale solution is 25%~45%, preferably 30%~40%, wherein the molar ratio of platinum, iridium, ruthenium, gold, cerium, rhodium, tantalum, manganese, nickel, palladium, yttrium, gadolinium, cobalt, europium, lanthanum, neodymium, zirconium and titanium in the composite material solution is 5~15:23~34:14~21:1~7: 9~17:3~12:15~27:3~6:2~9:10~23:15~27:2~8:15~30:3~12: 4~14:1~10:6~15:20~50;

(2) Drying the electrode coated with the composite material solution in step (1) at a temperature of 100~120° C., preferably 110~120° C. until the outer surface of the electrode has no liquid;

(3) Sintering the electrode dried in step (2) at a temperature of 400~680° C., preferably 450~600° C. for 8-10 hours.

Preferably, in step (1), the molar ratio of transition metal particles platinum, iridium, ruthenium, gold, cerium, tin, antimony, rhodium, tantalum, manganese, nickel, palladium, yttrium, gadolinium, cobalt, europium, lanthanum, neodymium, zirconium and titanium in the composite material solution is 5~13:23~31:14~20:1~6:9~15:5~9:2~8:3~10: 15~25:3~6:2~8:10~21:15~25:2~7:15~28:3~11:4~13:1~9: 6~13:20~48;

preferably 6~13:24~31:16~20:2~6:10~15:6~9:3~8:4~10: 17~25:4~6:3~8:11~21:17~25:3~7:17~28:4~11:6~13:2~9: 7~13:22~48;

more preferably 6~11:24~29:16~19:2~5:10~13:6~8:3~7: 4~8:17~22:4~5:3~7:11~19:17~23:3~6:17~26:4~10:6~11: 2~8:7~12:22~46;

further preferably 7~11:25~29:17~19:3~5:11~13:7~8: 4~7:5~8:19~22:4~5:4~7:12~19:18~23:4~6:19~26:5~10: 7~11:3~8:8~12:24~46;

more further preferably 7~9:25~27:17~18:3~4:11~12: 7~8:4~6:5~7:19~21:4:4~6:12~17:18~21:4~5:19~23:5~8: 7~9:3~6:8~10:24~41;

most preferably 8:26:17:3:11:8:5:6:20:4:5:15:19:4:21:7: 8:5:9:29.

Preferably, in step (1), the particle size of the particles of the transition metal elements in the composite material solution is 5-30 nm.

Preferably, the method further comprises:

coating uniformly firstly a tin-antimony solution on the outer surface of the titanium or titanium alloy substrate prior to coating the composite material solution on the outer surface of the titanium or titanium alloy substrate, wherein the tin-antimony solution is a nanoscale solution formed by dissolving tin and antimony in ethanol, the particles of tin and antimony are taken as the solute of the nanoscale solution, the mass percentage of the nanoscale solution is 5%~9%, preferably 7%, wherein the molar ratio of tin to antimony in the solution is 5-10:2-10;

preferably, the molar ratio of tin to antimony in the solution is 5-9:2-8;

more preferably, the molar ratio of tin to antimony in the solution is 6-9:3-8;

further preferably, the molar ratio of tin to antimony in the solution is 6-8:3-7;

more further preferably, the molar ratio of tin to antimony in the solution is 7-8:4-7;

still more further preferably, the molar ratio of tin to antimony in the solution is 7-8:4-6;

most preferably, the molar ratio of tin to antimony in the solution is 8:5;

and then drying the above-mentioned electrode coated with the tin-antimony solution at a temperature of 100~420° C., preferably 110~420° C., until the outer surface of the electrode has no liquid state;

finally, sintering the above-mentioned dried electrode at a temperature of 400~680° C., preferably 450~600° C. for 8-10 hours.

Preferably, based on the total weight of the titanium alloy, the titanium alloy consists of Al:4.0%~4.9%; Sn:1.1%~2.5%; Cr:1.1%~2.5%; Mo:1.1%~2.5%; Zr:1.1%~2.5%; Fe:0.11%~0.15%; C:0.08%~0.16%; O:0.11%~0.26%; N:0.004%~0.2%; H:0.06%~0.28%; Si:0.02%~1.0%, the balance being titanium and unavoidable impurities;

preferably, the content of Al in the titanium alloy is 4.1%~4.6%, preferably 4.1%~4.4%;

preferably, the content of Sn in the titanium alloy is 1.2%~2.1%, preferably 1.4%~2.1%;

preferably, the content of Cr in the titanium alloy is 1.3%~2.0%, preferably 1.4%~2.1%; more preferably 1.6%~2.0%;

preferably, the content of Mo in the titanium alloy is 1.2%~2.1%, preferably 1.3%~2.0%; more preferably 1.5%~2.1%;

preferably, the content of Zr in the titanium alloy is 1.3%~2.1%, preferably 1.4%~2.1%; more preferably 1.5%~2.1%;

preferably, the content of Fe in the titanium alloy is 0.13%~0.14%, preferably 0.13% or 0.14%;

preferably, the content of C in the titanium alloy is 0.09%~0.10%, preferably 0.09%~0.12%;

preferably, the content of O in the titanium alloy is 0.13%~0.21%, preferably 0.16%~0.21%; more preferably 0.16%~0.2%;

preferably, the content of N in the titanium alloy is 0.005%~0.02%, preferably 0.006%~0.07%; more preferably 0.009%~0.04%;

preferably, the content of H in the titanium alloy is 0.07%~0.21%, preferably 0.08%~0.21%;

preferably, the content of Si in the titanium alloy is 0.04%~0.6%, preferably 0.04%~0.7%.

In still another aspect, the present invention provides a device comprising the aforementioned electrode; preferably, the device is a food purification device, a water purification device or a medical product purification device, preferably a food purification device.

In still yet another aspect, the present invention provides a food purification device comprising a water tank, a generator box and a water catalyst generator, wherein, one side wall of the water tank has a water flow channel, the generator box is fixed on the outside of the water flow channel on the side wall of the water tank;

the generator box is divided into two chambers by a porous protective plate, the water catalyst generator is placed in the chamber near the bottom of the generator box, an aeration pipe is placed at the bottom of the chamber near the side wall of the water tank, the wall of the aeration pipe has rows of aeration holes, the aeration pipe interface leads to the outside of the generator box;

the wall of the another chamber of the generator box which is in a curved shape and above the porous protective plate is connected to the water flow channel of the side wall of the water tank;

wherein the anode electrode of the water catalyst generator is the aforementioned electrode.

Preferably, a seal ring is designed between the side wall of the water sink and the generator box.

Compared with the prior art, the present invention has at least the following beneficial technical effects:

1. In the composite material coating of the present invention, the tantalum element is added thereinto, due to the addition of the tantalum element, the microstructure of the coating is honeycomb-like, and the crack of the coating was not obvious. The combination of tantalum and titanium produces both the mechanical effect and the chemical effect, the mechanical effect can increase the effective geometric area of the substrate and improve the binding force between the coating and the substrate, and the chemical effect makes the surface of the substrate form a Ta—Ti mixed compound and further increase the anti-passivation effect of the coating. In addition, the addition of tantalum can increase the active point inside the coating and enhance the catalytic effect of the coating.

2. In the composite material coating of the present invention, the cobalt element is added thereinto, the addition of the cobalt element can refine the grain of the coating. When the molar content of the cobalt element is less than 30%, the addition of the cobalt element can significantly improve the electrocatalytic activity of the coating. When the molar content of the cobalt element is more than 30%, the fortified life of the coating can be increased by 40%.

3. In the present invention, the tin-antimony coating can be added, and the addition of tin and antimony make it is difficult for the electrolyte to penetrate into the surface of the titanium or titanium alloy substrate, which improves the ability of coating to resist erosion and prolongs the service life. Due to the sintering treatment, the titanium and tin in the coating form titanium dioxide and tin dioxide, both the titanium dioxide and the tin dioxide are tetragonal rutile structures, they have similar lattice constants and can form a good solid solution, which enhances the binding force between the coating and the titanium substrate, and the coating does not easily fall off.

In addition, the tin dioxide has a wide energy band, good chemical stability and electrochemical stability. The ion radius of $Sn^{4+}$ is 0.071 nm, therefore, the tin dioxide can firmly combine with the substrate. After the tin dioxide is doped with antimony atoms, 5-valent antimony atom replaces 4-valent of tin atom, the one extra electron enters the conduction band, which makes the electron concentration in the conduction band greatly increase, and thus the conductivity of the functional layers can be significantly improved.

4. The composite oxide has a small grain size and a high specific surface area because of the interaction between cerium and titanium, which improves the catalytic activity. At the same time, gadolinium, yttrium and cerium can increase the concentration of holes in the coating microstructure, which improves the electrical conductivity of the electrode.

DETAILED DESCRIPTION OF PREFERRED EMBODIMENTS

Figure 1:
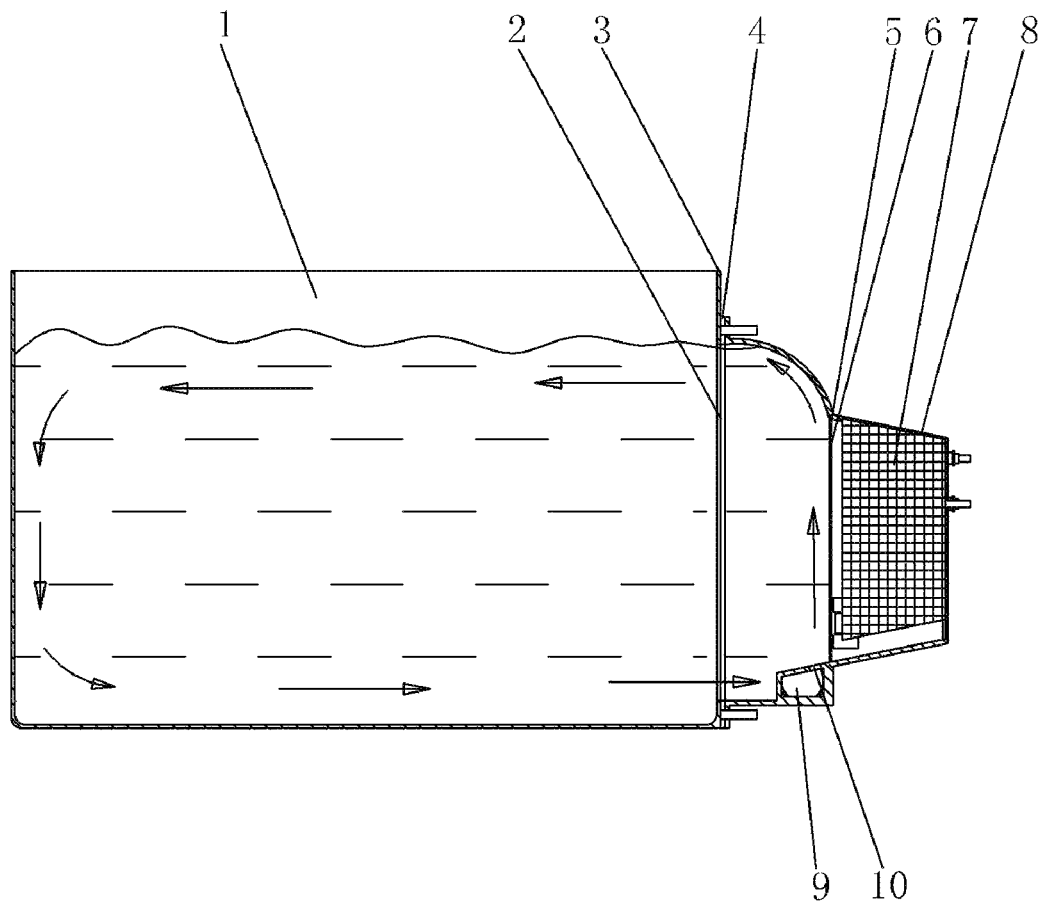
FIG. 1 is a cross-sectional view of a food purification device according to the present invention.

The present invention will now be described more fully with reference to the following examples. These examples are intended to illustrate and explain the present invention and are not intended to limit the scope of the invention.

EXAMPLE 1

The Electrode of the Present Invention and the Preparation Method Thereof

An electrode, the electrode used a titanium alloy as the substrate, the outer surface of the substrate was coated with a layer of composite material coating, the composite material coating was prepared by coating a composite material solution, then drying and sintering, wherein the composite material solution was a nanoscale solution formed by dissolving transition metal elements in ethanol, the particles of the transition metal elements were taken as the solute of the nanoscale solution, the transition metal elements were platinum, iridium, ruthenium, gold, cerium, rhodium, tantalum, manganese, nickel, palladium, yttrium, gadolinium, cobalt, europium, lanthanum, neodymium, zirconium and titanium, the molar ratio of the transition metal elements platinum, iridium, ruthenium, gold, cerium, rhodium, tantalum, manganese, nickel, palladium, yttrium, gadolinium, cobalt, europium, lanthanum, neodymium, zirconium and titanium in the composite material solution was 12:27:16:5:12:10:15:4:5:18:21:4:19:9:12:4:8:45.
Wherein, the mass percentage of the composite material solution was 30%.
Wherein, the particle size of the particles of the transition metal elements in the composite material solution was 20 nm.
Wherein, the composite material coating had a thickness of 5 um.
Wherein, the drying temperature was 115° C.
Wherein, the sintering temperature was 550° C.
Wherein, based on the total weight of the titanium alloy, the titanium alloy consisted of: Al:4.2%; Sn:1.9%; Cr:2.1%; Mo:1.1%; Zr:1.8%; Fe:0.11%; C:0.12%; O:0.19%; N:0.09%; H:0.12%; Si:0.8%, the balance being titanium and unavoidable impurities.

The preparation method of the electrode was as follows:
(1) coating uniformly the composite material solution on the outer surface of the titanium alloy about 10 times, wherein the composite material solution was a nanoscale solution formed by dissolving the transition metal elements in ethanol, the particles of the transition metal elements were taken as the solute of the nanoscale solution, the mass percentage of the nanoscale solution was 30%, wherein the molar ratio of the transition metal elements platinum, iridium, ruthenium, gold, cerium, rhodium, tantalum, manganese, nickel, palladium, yttrium, gadolinium, cobalt, europium, lanthanum, neodymium, zirconium and titanium in the composite material solution was 12:27:16:5:12:10:15:4:5:18:21:4:19:9:12:4:8:45;
(2) after brushing every time, drying the electrode coated with the composite material solution in step (1) at a temperature of 115° C. until the outer surface of the electrode had no liquid state;
(3) after drying for the last time, sintering the electrode dried in step (2) at a temperature of 550° C. for 8 hours, thus, the electrode of the present invention was obtained.
In this example, the substrate may also be titanium.

EXAMPLE 2

The Electrode of the Present Invention and the Preparation Method Thereof

An electrode, the electrode used a titanium alloy as the substrate, the outer surface of the substrate was coated with a layer of composite material coating, the composite material coating was prepared by coating a composite material solution, then drying and sintering, wherein the composite material solution was a nanoscale solution formed by dissolving transition metal elements in ethanol, the particles of the transition metal elements were taken as the solute of the nanoscale solution, the transition metal elements were platinum, iridium, ruthenium, gold, cerium, rhodium, tantalum, manganese, nickel, palladium, yttrium, gadolinium, cobalt, europium, lanthanum, neodymium, zirconium and titanium, the molar ratio of the transition metal elements platinum, iridium, ruthenium, gold, cerium, rhodium, tantalum, manganese, nickel, palladium, yttrium, gadolinium, cobalt, europium, lanthanum, neodymium, zirconium and titanium in the composite material solution was 12:27:16:5:12:10:15:4:5:18:21:4:19:9:12:4:8:45.
Wherein, the mass percentage of the composite material solution was 30%.
Wherein, the particle size of the particles of the transition metal elements in the composite material solution was 20 nm.
Wherein, the electrode further comprised a tin-antimony coating, the coating was placed between the substrate and the composite material coating, wherein the tin-antimony coating was prepared by coating a tin-antimony solution, then drying and sintering, the tin-antimony solution is a nanoscale solution formed by dissolving tin and antimony in ethanol, the particles of tin and antimony were taken as the solute of the nanoscale solution, the molar ratio of tin to antimony in the solution was 6:7.
Wherein, the particle size of the particles of tin and antimony in the tin-antimony solution was 20 nm.
Wherein, the composite material coating or the tin-antimony coating had a thickness of 5 μm.
Wherein, the drying temperature for preparing the composite coating or the tin-antimony coating was 115° C.

Wherein, the sintering temperature for preparing the composite coating or the tin-antimony coating was 500° C.

The preparation method of the electrode was as follows:

(1) coating uniformly the tin-antimony solution on the outer surface of titanium alloy about 10 times, wherein the tin-antimony solution was a nanoscale solution formed by dissolving tin and antimony in ethanol, the particles of tin and antimony were taken as the solute of the nanoscale solution, the mass percentage of the nanoscale solution was 10%, wherein the molar ratio of tin to antimony in the solution is 6:7;

after brushing every time, drying the electrode coated with the tin-antimony solution at a temperature of 115° C. until the outer surface of the electrode had no liquid state;

after drying for the last time, sintering the above dried electrode at a temperature of 500° C. for 8 hours.

(2) coating uniformly the composite material solution on the outer surface of the titanium alloy coated with the tin-antimony solution about 10 times, wherein the composite material solution was a nanoscale solution formed by dissolving the transition metal elements in ethanol, the particles of the transition metal elements were taken as the solute of the nanoscale solution, the mass percentage of the nanoscale solution was 30%, wherein the molar ratios of the transition metal elements platinum, iridium, ruthenium, gold, cerium, rhodium, tantalum, manganese, nickel, palladium, yttrium, gadolinium, cobalt, europium, lanthanum, neodymium, zirconium and titanium was 12:27:16:5:12:10:15:4:5:18:21:4:19:9:12:4:8:45;

(3) after brushing every time, drying the electrode coated with the composite material solution in step (1) at a temperature of 115° C. until the outer surface of the electrode had no liquid state;

(4) after drying for the last time, sintering the electrode dried in step (2) at a temperature of 500° C. for 8 hours, and thus the electrode of the present invention was obtained.

In this example, the substrate may also be titanium.

EXAMPLE 3

The Food Purification Device of the Present Invention

Figure 2:
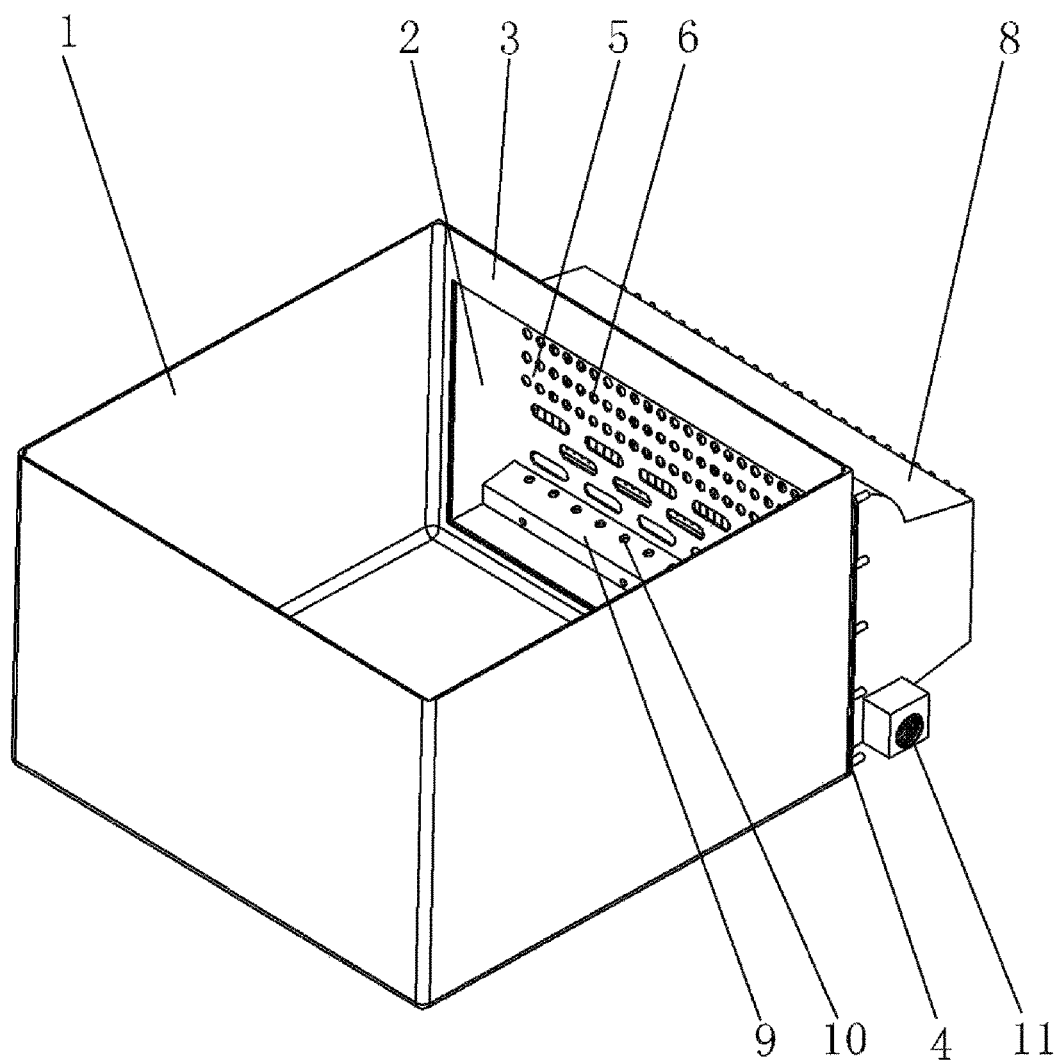
FIG. 2 is a left side view of a food purification device according to the present invention.
Figure 3:
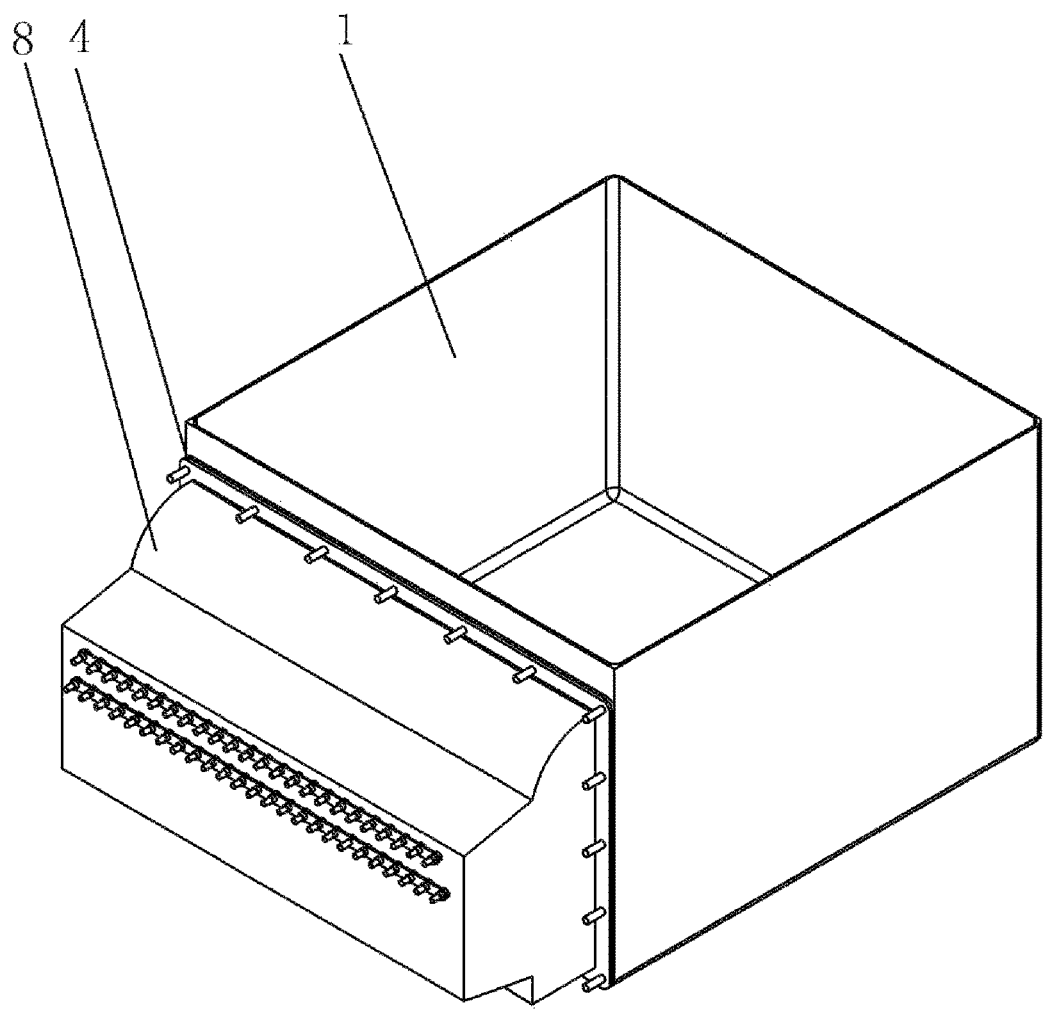
FIG. 3 is a right side view of a food purification device according to the present invention.
The meanings of the number in the drawing are as follows:
1. Water tank, 2. Water flow channel, 3. Side wall, 4. Seal ring, 5. Porous protective plate, 6. Hole, 7. Water catalyst generator, 8. Generator box, 9. Aeration pipe, 10. Aeration hole, 11. Aeration pipe interface.

As shown in FIGS. 1, 2 and 3, the food purification device of the present invention is also referred to as a longitudinal swirl purifying tank, the main component of the device comprises a water tank 1, a generator box 8 and a water catalyst generator 7 (wherein the electrode prepared according to example 2 of the present invention was used), wherein, one side wall 3 of the water tank 1 had a water flow channel 2, the generator box 8 was fixed on the outside of the water flow channel 2 on the side wall 3 of the water tank 1, the generator box 8 can be welded to the outside of the water tank 1, or the generator box 8 can be fixedly connected to the outside of the water tank 1 by means of bolts, if the bolts were used for connection, a seal ring 4 should be used between the side wall 3 of the water tank 1 and the generator box 8 to prevent leakage; the generator box 8 was divided into two chambers by a porous protective plate 5, the water catalyst generator 7 was placed in the chamber near the bottom of the generator box 8, an aeration pipe 9 was placed at the bottom of the chamber near the side wall 3 of the water tank 1, the walls of the aeration pipe 9 had rows of aeration holes 10, the aeration pipe interface 11 of the aeration pipe 9 leads to the outside of the generator box 8, an air pump was connected to the aeration pipe interface 11 through pipeline, the wall of another chamber of the generator box 8 which was in a curved shape and designed above the porous protective plate 5 was connected to the port of the water flow channel 2 of the side wall 3 of the water tank 1.

When using the food purification device, water and the object to be washed were put in the water tank 1, the air was pumped into through the air pump, the air entered the aeration pipe 9 through the aeration pipe interface 11, and drained into the water of the water tank 1 from the aeration hole 10 to form a lots of bubbles, the bubbles drove the water around them up during the rising process, when contacting with the curved wall of the upper part of the generator box 8, the bubbles were reflected to change the flow direction, flew toward another direction of the water tank, hit the other side of the water tank 1 and turned down, and then returned horizontally to the aeration pipe 9 to form a longitudinal swirl, so that the object to be washed was rolled over and washed under the impact of the longitudinal swirl and lots of bubbles, the blasting action of the bubbles injected into the water further strengthened the cleaning effect while a portion of water in the swirl entered the bottom chamber of the generator box 8 through the holes in the lower part of the porous protective plate 5, and flowed through the water catalyst generator 7 to generate hydroxyl radicals under the action of the electrode, the hydroxyl radical entered the water tank 1 following the water stream from the holes above the porous protective plate 5 and mixed with the water therein, the object to be washed was further purified, disinfected and sterilized, the porous protective plate 5 can prevent the object to be washed from impacting and damaging the water catalyst generator 7.

The amount of pesticide residue (mg/kg) on the surface of fruits and vegetables purified by using the above-described food purification device are shown in the following table:

| Nos. | Names of Pesticides | Amounts of Pesticide Residue (mg/kg) |
|---|---|---|
| 1 | Acephate | Fruits: 0.5; Vegetables: 1; |
| 2 | Amitraz | Fruit vegetables: 0.5; Pomefruits: 0.5; *Citrus* fruits: 0.5; |
| 3 | Anilazine | Tomato: 10; Cucumber: 10; |
| 4 | Azocyclotin | Pomefruits: 2; *Citrus* fruits: 2; |
| 5 | Bifenthrin | Pomefruits: 0.5; *Citrus* fruits: 0.05; |
| 6 | Bromopropylate | Pomefruits: 2; *Citrus* fruits: 2; |
| 7 | Buprofezin | *Citrus* fruits: 0.5; |
| 8 | Cadusafos | *Citrus*: 0.005; |
| 9 | Captan | Pomefruits: 15; |
| 10 | 1-Naphthalenyl methyl carbamate | Vegetables: 2; |
| 11 | Carbendazim | Tomato: 0.5; Cucumber: 0.5; Asparagus: 0.1; Chili: 0.1; Pomefruits: 3; Grape: 3; Other fruits: 0.5; |
| 12 | Carbofuran | Potato: 0.1; *Citrus* fruits: 0.5; |
| 13 | Carbosulfan | *Citrus* fruits: 0.1; |
| 14 | Chlorbenzuron | Cole crops: 3; |

-continued

| Nos. | Names of Pesticides | Amounts of Pesticide Residue (mg/kg) |
|---|---|---|
| 15 | Chlorothalonil | Leafy vegetables: 5; Fruit vegetables: 5; Melon vegetables: 5; Pomefruits: 1; Grape: 0.5; *Citrus*: 1; |
| 16 | Chlorpyrifos | Leafy vegetables: 0.1; Cole crops: 1; Tomato: 0.5; Stem vegetables: 0.05; Leek: 0.1; Pomefruits: 1; *Citrus* fruits: 2; |
| 17 | Clofentezine | Pomefruits: 0.5; *Citrus* fruits: 0.5; |
| 18 | Cyfluthrin | Cole crops: 0.1; Apple: 0.5; |
| 19 | Cyhalothrin | Leafy vegetables: 0.2; Fruit vegetables: 0.2; Pomefruits: 0.2; *Citrus*: 0.2; |
| 20 | CyperMethrin | Leafy vegetables: 2; Fruit vegetables: 0.5; Cucumber: 0.2; Legume vegetables: 0.5; Pomefruits: 2; *Citrus* fruits: 2; |
| 21 | 2,4-D | Cabbage: 0.2; Fruit vegetables: 0.1; |
| 22 | Dichlorodiphenyltrichloroethane | Beans: 0.05; Potatoes: 0.05; Vegetables: 0.05; Fruits: 0.05 |
| 23 | Deltamethyrin | Leafy vegetables: 0.5; Cole crops: 0.5; Fruit vegetables: 0.2; Pomefruits: 0.1; *Citrus* fruits: 0.05; |
| 24 | DDVP | Vegetables: 0.2; Fruits: 0.2; |
| 25 | Dicofol | Pomefruits: 1; *Citrus* fruits: 1; |
| 26 | Diflubenzuron | Leafy vegetables: 1; Cole crops: 1; Pomefruits: 1; *Citrus* fruits: 1; |
| 27 | Rogor | Leafy vegetables: 1; Cole crops: 1; Fruit vegetables: 0.5; Legume vegetables: 0.5; Stem vegetables: 0.5; Bulb vegetables: 0.2; Root vegetables: 0.5; Pomefruits: 1; Stone fruits: 2; *Citrus* fruits: 2; |
| 28 | Esfenvalerate | Leafy vegetables: 1; Pomefruits: 1; |
| 29 | Fenitrothion | Vegetables: 0.5; Fruits: 0.5; |
| 30 | Fenpropathrin | Leafy vegetables: 0.5; Fruits: 5.0; |
| 31 | Fenthion | Vegetables: 0.05; Fruits: 0.05; |
| 32 | fenvalerate | Leafy vegetables: 0.5; Cole crops: 0.5; Fruit vegetables: 0.2; Melon vegetables: 0.2; Root vegetables: 0.05; Fruits: 0.2; |
| 33 | Flucythrinate | Cole crops: 0.5; Fruit vegetables: 0.2; Root vegetables: 0.05; Pomefruits: 0.5; |
| 34 | Hexachlorocyclohexane | Vegetables: 0.05; Fruits: 0.05; |
| 35 | Malathion | Leafy vegetables: 8; Cole crops: 0.5; Fruit vegetables: 0.5; Legume vegetables: 2; Celery: 1; Root vegetables: 0.5; |
| 36 | Gramoxon | Vegetables: 0.05; |
| 37 | Pendimethalin | Leafy vegetables: 0.1; |
| 38 | Permethrin | Vegetables: 1; Fruit: 2; |
| 39 | Phosalone | Leafy vegetables: 1; |
| 40 | Phosmet | Cabbage: 0.5; *Citrus* fruits: 5; |
| 41 | phoxim | Vegetables: 0.05; Fruits: 0.05; |
| 42 | Prochloraz | Mushroom: 2; *Citrus*: 5; Banana: 5; Mango: 2; |
| 43 | procymidone | Fruit vegetables: 5; Cucumber: 2; Leek: 0.2; Grape: 5; Strawberry: 10; |
| 44 | propargite | Leafy vegetables: 2; Pomefruits: 5; *Citrus* fruits: 5; |
| 45 | triadimefon | Cucumber: 0.1; pea: 0.05; Pomefruits: 0.5; |
| 46 | Dipterex | Vegetables: 0.1; Fruits: 0.1. |

EXAMPLE 4

The electrodes were prepared by using the method described in example 2, wherein the molar ratio of the transition metal elements platinum, iridium, ruthenium, gold, cerium, rhodium, tantalum, manganese, nickel, palladium, yttrium, gadolinium, cobalt, europium, lanthanum, neodymium, zirconium and titanium in the composite material solution of the electrode A was 11:23:15:3:12:9:19:4:6:17:19:2:18:7:12:4:14:35, the molar ratio of tin to antimony in the tin-antimony solution was 7:6; the molar ratio of the transition metal elements platinum, iridium, ruthenium, gold, cerium, rhodium, tantalum, manganese, nickel, palladium, yttrium, gadolinium, cobalt, europium, lanthanum, neodymium, zirconium and titanium in the composite material solution of the electrode B was 11:23:15:3:12:9:19:4:6:17:19:3:18:7:12:4:14:35, the molar ratio of tin to antimony in the tin-antimony solution was 7:6; the molar ratio of the transition metal elements platinum, iridium, ruthenium, gold, cerium, rhodium, tantalum, manganese, nickel, palladium, yttrium, gadolinium, cobalt, europium, lanthanum, neodymium, zirconium and titanium in the composite material solution of electrode C was 11:23:15:3:12:9:19:4:6:17:19:4:18:7:12:4:14:35, the molar ratio of tin to antimony in tin-antimony solution was 7:6. The remaining conditions were the same as that of example 2.

The above electrodes were respectively installed in the food purification tank of example 3 as the anode, a stainless steel alloy or a titanium alloy was taken as the cathode, 5 L tap water was added to the water tank, 1.5 ml pesticide chlorpyrifos with a concentration of 2.4 mg/L was added into the water and mixed evenly, part of water samples was taken out as the unpurified samples for testing. The power was turned on and the voltage was adjusted to 18V, after purifying for 10 minutes, the purified water samples were tested respectively, and the data was compared.

| Names | Concentration of chlorpyrifos/mg/L | Degradation rate % |
| --- | --- | --- |
| Unpurified water samples | 0.66 | — |
| Electrode A | 0.31 | 53 |
| Electrode B | 0.25 | 62.1 |
| Electrode C | 0.19 | 71.2 |

It can be seen from the above data, the degradation rate on pesticides increased with the increase of the gadolinium content, this shows that the increase of the gadolinium content can effectively improve the catalytic activity of electrodes.

EXAMPLE 5

The electrodes were prepared by using the method described in example 2, wherein the molar ratio of the transition metal elements platinum, iridium, ruthenium, gold, cerium, rhodium, tantalum, manganese, nickel, palladium, yttrium, gadolinium, cobalt, europium, lanthanum, neodymium, zirconium and titanium in the composite material solution of the electrode A was 11:23:15:3:9:9:19:4:6:17:19:2:18:7:12:4:14:35, the molar ratio of tin to antimony in the tin-antimony solution was 7:6; the molar ratio of the transition metal elements platinum, iridium, ruthenium, gold, cerium, rhodium, tantalum, manganese, nickel, palladium, yttrium, gadolinium, cobalt, europium, lanthanum, neodymium, zirconium and titanium in the composite material solution of the electrode B was 11:23:15:3:10:9:19:4:6:17:19:2:18:7:12:4:14:35, the molar ratio of tin to antimony in the tin-antimony solution was 7:6; the molar ratio of the transition metal elements platinum, iridium, ruthenium, gold, cerium, rhodium, tantalum, manganese, nickel, palladium, yttrium, gadolinium, cobalt, europium, lanthanum, neodymium, zirconium and titanium in the composite material solution of the electrode C was 11:23:15:3:12:9:19:4:6:17:19:2:18:7:12:4:14:35, the molar ratio of tin to antimony in tin-antimony solution is 7:6. The remaining conditions were the same as that of example 2.

The above electrodes were respectively installed in the food purification tank of example 3 as the anode, a stainless steel alloy or a titanium alloy was taken as the cathode, tap water was taken as the medium, the current intensity was 10-20 mA/cm$^2$, wherein only the cerium content was changed and the content of the other elements did not change, the operating voltage value of the titanium anodes in three solutions were as follows:

| Names | operating voltage value/V | Reduced energy consumption % |
| --- | --- | --- |
| A | 16-19 | |
| B | 14-17 | 10% |
| C | 11-15 | 21% |

It can be seen from the above results, when the cerium content was changed, under the same current intensity conditions, the output voltage decreased with the increase of the cerium content, this indicates that the addition of the cerium element can effectively reduce the energy consumption of the electrode, so that the operating costs was saved.

EXAMPLE 6

The electrodes were prepared by using the method described in example 2, wherein the molar ratio of the transition metal elements platinum, iridium, ruthenium, gold, cerium, rhodium, tantalum, manganese, nickel, palladium, yttrium, gadolinium, cobalt, europium, lanthanum, neodymium, zirconium and titanium in the composite material solution of the electrode A was 11:23:15:3:9:9:19:4:6:17:19:2:18:7:12:4:14:35, the molar ratio of tin to antimony in the tin-antimony solution was 7:6; the molar ratio of the transition metal elements platinum, iridium, ruthenium, gold, cerium, rhodium, tantalum, manganese, nickel, palladium, yttrium, gadolinium, cobalt, europium, lanthanum, neodymium, zirconium and titanium in the composite material solution of the electrode B was 11:23:15:3:9:9:19:4:6:17:21:2:18:7:12:4:14:35, the molar ratio of tin to antimony in the tin-antimony solution was 7:6; the molar ratio of the transition metal elements platinum, iridium, ruthenium, gold, cerium, rhodium, tantalum, manganese, nickel, palladium, yttrium, gadolinium, cobalt, europium, lanthanum, neodymium, zirconium and titanium in the composite material solution of the electrode C was 11:23:15:3:9:9:19:4:6:17:23:2:18:7:12:4:14:35, the molar ratio of tin to antimony in tin-antimony solution was 7:6. The remaining conditions were the same as that of example 2.

The above electrodes were respectively installed in the food purification tank of example 3 as the anode, a stainless steel alloy or a titanium alloy was taken as the cathode, 5 L tap water was added to the water tank, 2 ml pesticide dichlorvos with a concentration of 2 mg/L was added into the water and mixed evenly, part of the water samples was taken out as the unpurified samples for testing. The power was turned on and the voltage was adjusted to 18V, after purifying for 10 minutes, the purified water samples were tested respectively, and the data was compared.

| Names | Concentration of dichlorvos/mg/L | Degradation rate % |
| --- | --- | --- |
| Unpurified water samples | 0.52 | — |
| Electrode A | 0.2 | 61.5 |
| Electrode B | 0.13 | 75 |
| Electrode C | 0.08 | 84.6 |

It can be seen from the above data, the degradation rate on pesticides increased with the increase of the yttrium content, this shows that the increase of the yttrium content can effectively improve the catalytic activity of electrodes.

EXAMPLE 7

The electrodes A, B, C, D, E were prepared by using the method described in example 2, wherein the molar ratio of the transition metal elements platinum, iridium, ruthenium, gold, cerium, rhodium, tantalum, manganese, nickel, palladium, yttrium, gadolinium, cobalt, europium, lanthanum, neodymium, zirconium and titanium in the composite material solution of the electrode A was 8:26:17:3:11:6:20:4:5:15:19:4:21:7:8:5:9:29, the molar ratio of tin to antimony in the tin-antimony solution was 8:5; the molar ratio of the transition metal elements platinum, iridium, ruthenium, gold, cerium, rhodium, tantalum, manganese, nickel, palladium, yttrium, gadolinium, cobalt, europium, lanthanum, neodymium, zirconium and titanium in the composite material solution of the electrode B was 8:26:17:3:11:6:20:4:5:15:19:4:15:7:8:5:9:29, the molar ratio of tin to antimony in the tin-antimony solution was 8:5; the molar ratio of the transition metal elements platinum, iridium, ruthenium, gold, cerium, rhodium, tantalum, manganese, nickel, palladium, yttrium, gadolinium, cobalt, europium, lanthanum, neodymium, zirconium and titanium in the composite material solution of the electrode C was 8:26:17:3:11:6:20:4:5:15:19:4:30:7:8:5:9:29, the molar ratio of tin to antimony in tin-antimony solution was 8:5; the molar ratio of the transition metal elements platinum, iridium, ruthenium, gold, cerium, rhodium, tantalum, manganese, nickel, palladium, yttrium, gadolinium, cobalt, europium, lanthanum, neodymium, zirconium and titanium in the composite material solution of the electrode D was 8:26:17:3:11:6:20:4:5:15:19:4:12:7:8:5:9:29, the molar ratio of tin to antimony in tin-antimony solution was 8:5; the molar ratio of the transition metal elements platinum, iridium, ruthenium, gold, cerium, rhodium, tantalum, manganese, nickel, palladium, yttrium, gadolinium, cobalt, europium, lanthanum, neodymium, zirconium and titanium in the composite material solution of the electrode E was 8:26:17:3:11:6:20:4:5:15:19:4:33:7:8:5:9:29, the molar ratio of tin to antimony in tin-antimony solution was 8:5; the remaining conditions were the same as that of example 2.

The electrode F was prepared by using the method described in example 1, wherein the molar ratio of the transition metal elements platinum, iridium, ruthenium, gold, cerium, rhodium, tantalum, manganese, nickel, palladium, yttrium, gadolinium, cobalt, europium, lanthanum, neodymium, zirconium and titanium in the composite material solution of the electrode F was 8:26:17:3:11:6:20:4:5:15:19:4:21:7:8:5:9:29; the remaining conditions were the same as that of example 1.

The above electrodes were respectively installed in the food purification tank of example 3 as the anode, a stainless steel alloy or a titanium alloy was taken as the cathode, tap water was taken as the medium, the current intensity was 10-20 mA/cm$^2$, the operating voltage value and the reduced energy consumption level of the six solutions were as follows:

| Names | Output voltage/V |
| --- | --- |
| Electrode A | 15-17 |
| Electrode B | 16-19 |
| Electrode C | 13-15 |
| Electrode D | 19-21 |
| Electrode E | The operating voltage was 13-14, it was not selected as the life will be affected. |
| Electrode F | 18-21 |

It can be seen from the above table, when the cobalt content was changed, under the same current intensity conditions, the output voltage decreased with the increase of the cobalt content, this indicates that the addition of the cobalt element can effectively reduce the energy consumption of electrodes, so that the operating costs was saved. When comparing the electrode A with the electrode F, it can be seen that the operating voltage of the electrode F without additional intermediate layer of tin and antimony was higher than that of the electrode A under the case that other elements had the same content, this indicates that the intermediate layer of tin and antimony can effectively reduce the output voltage and the operating energy consumption of electrodes.

EXAMPLE 8

The electrodes A, B, C, D were prepared by using the method described in example 2, wherein the molar ratio of the transition metal elements platinum, iridium, ruthenium, gold, cerium, rhodium, manganese, nickel, palladium, yttrium, gadolinium, cobalt, europium, lanthanum, neodymium, zirconium and titanium in the composite material solution of the electrode A was 8:26:17:3:11:6:4:5:15:19:4:21:7:8:5:9:29, the molar ratio of tin to antimony in the tin-antimony solution was 8:5; the molar ratio of transition metal element platinum, iridium, ruthenium, gold, cerium, rhodium, tantalum, manganese, nickel, palladium, yttrium, gadolinium, cobalt, europium, lanthanum, neodymium, zirconium and titanium in the composite material solution of the electrode B was 8:26:17:3:11:6:15:4:5:15:19:4:21:7:8:5:9:29, the molar ratio of tin to antimony in the tin-antimony solution was 8:5; the molar ratio of the transition metal elements platinum, iridium, ruthenium, gold, cerium, rhodium, tantalum, manganese, nickel, palladium, yttrium, gadolinium, cobalt, europium, lanthanum, neodymium, zirconium and titanium in the composite material solution of the electrode C was 8:26:17:3:11:6:20:4:5:15:19:4:21:7:8:5:9:29, the molar ratio of tin to antimony in tin-antimony solution was 8:5. the molar ratio of the transition metal elements platinum, iridium, ruthenium, gold, cerium, rhodium, tantalum, manganese, nickel, palladium, yttrium, gadolinium, cobalt, europium, lanthanum, neodymium, zirconium and titanium in the composite material solution of the electrode D was 8:26:17:3:11:6:25:4:5:15:19:4:21:7:8:5:9:29, the molar ratio of tin to antimony in the tin-antimony solution was 8:5. The remaining conditions were the same as that of example 2.

The electrodes E was prepared by using the method described in example 1, wherein the molar ratio of the transition metal elements platinum, iridium, ruthenium, gold, cerium, rhodium, tantalum, manganese, nickel, palladium, yttrium, gadolinium, cobalt, europium, lanthanum, neodymium, zirconium and titanium in the composite material solution of the electrode E was 8:26:17:3:11:6:20:4:5:15:19:4:21:7:8:5:9:29; the remaining conditions were the same as that of example 1.

The above electrodes were respectively installed in the food purification tank of example 3 as the anode, a stainless steel alloy or a titanium alloy was taken as the cathode, tap water was taken as the medium, the current intensity was 10-20 mA/cm$^2$, the running time of the titanium electrodes fatigue experiment of the five solutions were as follows:

| Names | Running time/H |
| --- | --- |
| Electrode A | 2768 |
| Electrode B | 3379 |
| Electrode C | 3940 |
| Electrode D | 4733 |
| Electrode E | 3467 |

It can be seen from the above results, when the tantalum content was changed, under the same current intensity conditions, the running time of the electrodes increased with the increase of the tantalum content, this indicates that the addition of the tantalum element can effectively increase the operating life of electrodes. When comparing the electrode C with the electrode E, it can be seen that the operating life of the electrode E without additional intermediate layer of tin and antimony was lower than that of the electrode C under the case that other elements had the same content, this indicates that the intermediate layer of tin and antimony can effectively increase the operating life of electrodes.

EXAMPLE 9

The electrodes A, B, C, D, E were prepared by using the method described in example 2, wherein the molar ratio of the transition metal elements platinum, iridium, ruthenium, gold, cerium, rhodium, tantalum, manganese, nickel, palladium, yttrium, gadolinium, cobalt, europium, lanthanum, neodymium, zirconium and titanium in the composite material solution of the electrode A was 8:26:17:3:11:6:20:4:5:15:19:4:21:7:8:5:9:29, the molar ratio of tin to antimony in the tin-antimony solution is 0:5; the molar ratio of the transition metal elements platinum, iridium, ruthenium, gold, cerium, rhodium, tantalum, manganese, nickel, palladium, yttrium, gadolinium, cobalt, europium, lanthanum, neodymium, zirconium and titanium in the composite material solution of the electrode B was 8:26:17:3:11:6:20:4:5:15:19:4:15:7:8:5:9:29, the molar ratio of tin to antimony in the tin-antimony solution was 2:5; the molar ratio of the transition metal elements platinum, iridium, ruthenium, gold, cerium, rhodium, tantalum, manganese, nickel, palladium, yttrium, gadolinium, cobalt, europium, lanthanum, neodymium, zirconium and titanium in the composite material solution of the electrode C was 8:26:17:3:11:6:20:4:5:15:19:4:30:7:8:5:9:29, the molar ratio of tin to antimony in tin-antimony solution was 5:5. the molar ratio of the transition metal elements platinum, iridium, ruthenium, gold, cerium, rhodium, tantalum, manganese, nickel, palladium, yttrium, gadolinium, cobalt, europium, lanthanum, neodymium, zirconium and titanium in the composite material solution of the electrode D was 8:26:17:3:11:6:20:4:5:15:19:4:12:7:8:5:9:29, the molar ratio of tin to antimony in the tin-antimony solution was 8:5; the molar ratio of the transition metal elements platinum, iridium, ruthenium, gold, cerium, rhodium, tantalum, manganese, nickel, palladium, yttrium, gadolinium, cobalt, europium, lanthanum, neodymium, zirconium and titanium in the composite material solution of the electrode E was 8:26:17:3:11:6:20:4:5:15:19:4:33:7:8:5:9:29; the molar ratio of tin to antimony in the tin-antimony solution was 12:5. The remaining conditions were the same as that of example 2.

The electrode F was prepared by using the method described in example 1, wherein the molar ratio of the transition metal elements platinum, iridium, ruthenium, gold, cerium, rhodium, tantalum, manganese, nickel, palladium, yttrium, gadolinium, cobalt, europium, lanthanum, neodymium, zirconium and titanium in the composite material solution of the electrode F was 8:26:17:3:11:6:20:4:5:15:19:4:21:7:8:5:9:29. The remaining conditions were the same as that of example 1.

The above electrodes were respectively installed in the food purification tank of example 3 as the anode, a stainless steel alloy or a titanium alloy was taken as the cathode, 0.5 mol/L $H_2SO_4$ solution was taken as the medium, the accelerated service life testing was carried out under the condition of 2000 $A/m^2$, the running time of the six solutions was as shown in the following table:

| Names | Running time/H |
|---|---|
| Electrode A | 130 |
| Electrode B | 176 |
| Electrode C | 247 |
| Electrode D | 364 |
| Electrode E | 341 |
| Electrode F | 124 |

It can be seen from the above results, the addition of tin element can increase the life and the running time, the running time of the electrodes increased with the increase of the tin content, this illustrates that the addition of tin element can effectively increase the life of electrodes.

EXAMPLE 10

Electrode 1 of the present invention: which was prepared by using the method described in example 1, wherein the molar ratio of the transition metal elements platinum, iridium, ruthenium, gold, cerium, rhodium, tantalum, manganese, nickel, palladium, yttrium, gadolinium, cobalt, europium, lanthanum, neodymium, zirconium and titanium in the composite material solution was 11:23:15:3:9:9:19:4:6:17:23:2:18:7:12:4:14:35. The remaining conditions were the same as that of example 1.

Electrode 2 of the present invention: which was prepared by using the method described in example 2, wherein the molar ratio of the transition metal elements platinum, iridium, ruthenium, gold, cerium, rhodium, tantalum, manganese, nickel, palladium, yttrium, gadolinium, cobalt, europium, lanthanum, neodymium, zirconium and titanium in the composite material solution was 11:23:15:3:9:9:19:4:6:17:23:2:18:7:12:4:14:35; the molar ratio of tin to antimony in the tin-antimony solution was 7:6. The remaining conditions were the same as that of example 2.

Comparative electrode 1: which was the electrode disclosed in ZL201110271764.0, wherein six kinds of powders were platinum powder, iridium powder, yttrium powder, ruthenium powder, niobium powder and tantalum powder respectively, the six kinds of powders were mixed with anhydrous ethanol in a mass concentration of 3%, the molar ratio of platinum element, iridium element, yttrium element, ruthenium element, niobium element and tantalum element in the solution was 28:36:15:30:8:12, the thickness of the composite material coating prepared by using the method of example 1 was 3 microns.

The above electrodes were respectively installed in the food purification tank of example 3 as the anode, a stainless steel alloy or a titanium alloy was taken as the cathode, 5 L tap water was added to the water tank, 2 ml pesticide dichlorvos with a concentration of 2 mg/L was added into the water and mixed evenly, part of the water samples was taken out as the unpurified samples for testing. The power was turned on and the voltage was adjusted to 18V, after purifying for 10 minutes, the purified water samples were tested respectively, and the data was compared. The results were shown in the following table:

| Names | Concentration of dichlorvos/mg/L | Degradation rate % |
|---|---|---|
| Unpurified water samples | 0.86 | |
| Comparative electrode 1 | 0.21 | 75.6 |
| Electrode 1 of the present invention | 0.15 | 82.6 |
| Electrode 2 of the present invention | 0.13 | 84.8 |

The above examples only intend to illustrate the technical solutions of the present invention and do not intend to limit the technical solutions of the present application. Though the present invention has been described in detail with reference to the above-described embodiments, it should be understood by the person skilled in the art that, modifications may be made to the technical solutions described in the various embodiments described above, or equivalent replacements may be made to a part of the technical features in the above embodiments; and all these modifications or replacements do not make the essence of the respective technical solutions depart from the spirit and scope of the technical solutions of the embodiments of the present application. All of these modifications or equivalent replacements without departing from the principles and scope of the present invention shall fall into the scope defined by the appended claims.

The invention claimed is:

1. An electrode, comprising a titanium or titanium alloy substrate, the outer surface of the substrate is coated with a layer of composite material coating, the composite material coating is prepared by coating the substrate with a composite material solution, then drying and sintering, wherein the composite material solution is a nanoscale solution formed by dissolving transition metal elements in ethanol, particles of the transition metal elements are taken as the solute of the nanoscale solution, the transition metal elements are platinum, iridium, ruthenium, gold, cerium, rhodium, tantalum, manganese, nickel, palladium, yttrium, gadolinium, cobalt, europium, lanthanum, neodymium, zirconium and titanium, the molar ratio of the transition metal elements platinum, iridium, ruthenium, gold, cerium, rhodium, tantalum, manganese, nickel, palladium, yttrium, gadolinium, cobalt, europium, lanthanum, neodymium, zirconium and titanium in the composite material solution is 5-15:23-34:14-21:1-7:9-17:3-12:15-27:3-6:2-9:10-23:15-27:2-8:15-30:3-12:4-14:1-10:6-15:20-50.

2. The electrode according to claim 1, characterized in that the molar ratio of the transition metal elements platinum, iridium, ruthenium, gold, cerium, rhodium, tantalum, manganese, nickel, palladium, yttrium, gadolinium, cobalt, europium, lanthanum, neodymium, zirconium and titanium in the composite material solution is 7-11:25-29:17-19:3-5:11-13:5-8:19-22:4-5:4-7:12-19:18-23:4-6:19-26:5-10:7-11:3-8:8-12:24-46.

3. The electrode according to claim 1, characterized in that the molar ratio of the transition metal elements platinum, iridium, ruthenium, gold, cerium, rhodium, tantalum, manganese, nickel, palladium, yttrium, gadolinium, cobalt, europium, lanthanum, neodymium, zirconium and titanium in the composite material solution is 5-13:23-31:14-20:1-6:9-15:3-10:15-25:3-6:2-8:10-21:15-25:2-7:15-28:3-11:4-13:1-9:6-13:20-48.

4. The electrode according to claim 1, characterized in that a concentration of the composite material solution is 25%-45%.

5. The electrode according to claim 4, characterized in that the concentration of the composite material solution is 30%-40%.

6. The electrode according to claim 1, characterized in that the particle size of the particles of the transition metal elements in the composite material solution is 5-30 nm.

7. The electrode according to claim 1, characterized in that the electrode further comprises a tin-antimony coating, the tin-antimony coating is placed between the substrate and the composite material coating, wherein the tin-antimony coating is prepared by coating the substrate with a tin-antimony solution, then drying and sintering, the tin-antimony solution is a tin-antimony nanoscale solution formed by dissolving tin and antimony in ethanol, particles of tin and antimony are taken as the solute of the tin-antimony nanoscale solution, the molar ratio of tin to antimony in the tin-antimony nanoscale solution is 5-10:2-10.

8. The electrode according to claim 7, characterized in that the molar ratio of tin to antimony in the nanoscale solution is 6-8:3-7.

9. The electrode according to claim 7, characterized in that the particle size of the particles of tin and antimony in the tin-antimony nanoscale solution is 5-30 nm.

10. The electrode according to claim 7, characterized in that a concentration of the tin-antimony solution is 5%-9%.

11. The electrode according to claim 10, characterized in that the concentration of the tin-antimony solution is 7%.

12. The electrode according to claim 7, characterized in that the composite material coating or the tin-antimony coating has a thickness of 3-8 microns.

13. The electrode according to claim 12, characterized in that the composite material coating or the tin-antimony coating has a thickness of 4-6 microns.

14. The electrode according to claim 7, characterized in that temperature for the drying is 100-120° C. when preparing the composite material coating or the tin-antimony coating.

15. The electrode according to claim 7, characterized in that temperature for the sintering is 400-680° C. when preparing the composite material coating or the tin-antimony coating.

16. The electrode according to claim 1, characterized in that the titanium alloy consists of, based on the total weight of the titanium alloy, Al:4.0%-4.9%; Sn:1.1%-2.5%; Cr:1.1%-2.5%; Mo:1.1%-2.5%; Zr:1.1%-2.5%; Fe:0.11%-0.15%; C:0.08%-0.16%; O:0.11%-0.26%; N:0.004%-0.2%; H:0.06%-0.28%; Si:0.02%-1.0%, the balance being titanium and unavoidable impurities.

17. A method for manufacturing the electrode according to claim 1, which comprises the following steps:
   (1) coating uniformly the composite material solution on the outer surface of the titanium or titanium alloy substrate;
   (2) drying the electrode coated with the composite material solution in step (1) at a temperature of 100-120° C. until the outer surface of the electrode has no liquid;
   (3) sintering the electrode dried in step (2) at a temperature of 400-680° C. for 8-10 hours.

18. A method for manufacturing the electrode according to claim 7, the method comprising the following steps:
   coating uniformly firstly the tin-antimony solution on the outer surface of the titanium or titanium alloy substrate prior to coating the composite material solution on the outer surface of the titanium or titanium alloy substrate;
   and then drying the electrode coated with the tin-antimony solution at a temperature of 100-120° C. until the outer surface of the electrode has no liquid; and
   finally, sintering the above-mentioned dried electrode at a temperature of 400-680° C. for 8-10 hours.

19. A device comprising the electrode according to claim 1, wherein the device is a food purification device, a water purification device or a medical product purification device.

20. A food purification device comprising a water tank, a generator box and a water catalyst generator, wherein,
   one side wall of the water tank has a water flow channel, the generator box is fixed outside of the water flow channel on the side wall of the water tank;
   the generator box is divided into two chambers by a porous protective plate, the water catalyst generator is placed in one chamber of the two chambers near a bottom of the generator box, an aeration pipe is placed at a bottom of another chamber of the two chambers near the side wall of the water tank, walls of the aeration pipe have rows of aeration holes, an interface for the aeration pipe leads to outside of the generator box;
   walls of the another chamber of the generator box which is in a curved shape and designed above the porous protective plate is connected to the water flow channel of the side wall of the water tank;

wherein an anode electrode of the water catalyst generator is the electrode according to claim 1.

21. The food purification device according to claim 20, characterized in that a seal ring is designed between the side wall of the water tank and the generator box.

\* \* \* \* \*